March 30, 1965 W. L. PELTIER 3,176,111
ADAPTER FOR BRUSHLESS WIRE PREHEATER
Filed Aug. 6, 1963
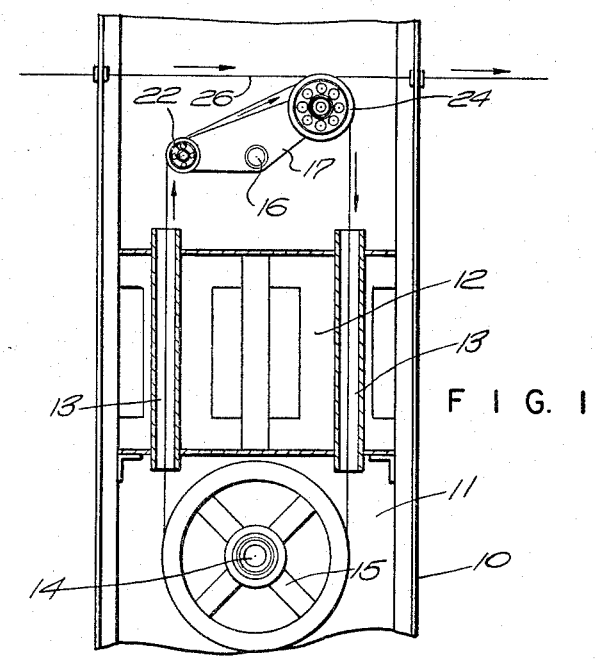
FIG. 1
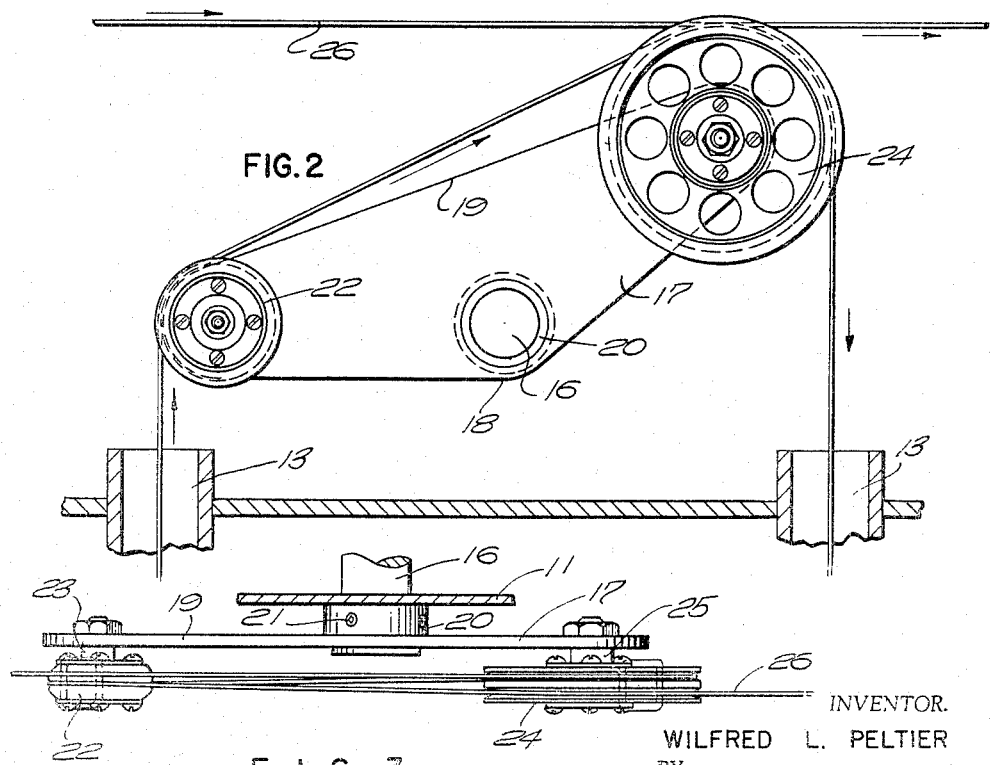
FIG. 2
FIG. 3
INVENTOR.
WILFRED L. PELTIER
BY
ATTORNEY

United States Patent Office 3,176,111
Patented Mar. 30, 1965

3,176,111
ADAPTER FOR BRUSHLESS WIRE PREHEATER
Wilfred L. Peltier, Johnston, R.I., assignor to Walco Electric Company, Providence, R.I., a corporation of Rhode Island
Filed Aug. 6, 1963, Ser. No. 300,226
7 Claims. (Cl. 219—10.61)

My present invention relates to electrical wire preheaters and more particularly to an adapter for a wire preheater for handling small diameter wires.

The principal object of the present invention is to provide an adapter for the type of wire preheater shown in my copending application Serial No. 171,976, filed February 8, 1962, and entitled "Brushless-Wire Preheater, now Patent No. 3,117,209.

Another object of the present invention is to provide an adapter which is particularly suitable for reducing the heat loss factor in the handling of small diameter wires.

A further object of the present invention is to provide an adapter for a wire preheater which is simple in construction and easy and economical to manufacture and assemble.

With the above and other objects and advantageous features in view, my invention consists of a novel arrangement of parts, more fully disclosed in the detailed description following, in conjunction with the accompanying drawings, and more particularly described in the appended claims.

In the drawings,

FIG. 1 is a front elevation partly in section of a wire preheater having an adapter embodying my invention.

FIG. 2 is an enlarged front elevation of the adapter.

FIG. 3 is a top plan view thereof.

In my copending application above referred to, I have provided a device for preheating an electrical wire or cable moving into an extruding die. This is necessary so that the insulation will not shrink from the cold wire. The device provides a pair of spaced wheels and an inductor positioned between them. The wire forms a loop between the wheels and through the inductor which induces a current in the wire and thus heats it. The wheels are rotated by the movement of the wire which is pulled through the extrusion die. Various safety devices are provided to prevent burning the wire when the movement slows down or stops.

There is necessarily a space between the preheater and the die which results in a heat loss. This can be made up by heating the wire above the required temperature and is controlled by a thermostat positioned near the die. It has been found that there is a considerable heat loss at the upper wheel. The heated wire makes a quarter turn around the upper wheel before leaving the preheater. This heat loss can also be made up. However, on the smaller diameter wires, there is a limit as to the temperature compatible with the wire. Also, the smaller diameter presents less bulk for storing the heat and it is quickly dissipated around the wheel. Accordingly, the present invention is designed to provide an adapter for the preheater shown in my copending application, for handling the smaller diameter wires.

Referring more in detail to the drawings, the wire preheater comprises a housing 10 having a wall portion 11 recessed from the front of the housing. An inductor 12 is mounted in the housing in front of the wall 11. A pair of spaced vertical insulated passageways 13 are provided through the inductor 12. A shaft 14 extends forwardly from the wall 11 beneath the inductor 12, and a grooved wheel 15 is rotatably mounted thereon. Above the inductor 12, a shaft 16 is mounted in the wall 12.

In my copending application above referred to, a second grooved wheel is normally mounted on the shaft 16. However, in order to flatten the angle at which the looped wire contacts the upper wheel, the adapter of the present invention has been devised. The adapter comprises a triangular plate 17 shaped to form an obtuse angle 18 opposite the hypotenuse 19. Adjacent the angle 18, a collar 20 is mounted in the plate 17 and is adapted to fit over the shaft 16 as shown in FIG. 3. Set screws 21 are used to lock the adapter to the shaft 16.

The plate 17 is mounted with one short side horizontal and the other short side extending angularly upwardly. At the end of the horizontal short side, to the left in the figures, an idler pulley wheel 22 is rotatably mounted on a shaft 23 which is mounted in the plate 17. The wheel 22 is grooved and comparatively small. The left edge of the wheel 22 is over the left passageway 13. The small wheel is only an idler and is preferably made of a heat resistant non-conductive plastic or ceramic material which will absorb as little heat as possible from the wire.

At the right end of the plate 17, a double-grooved wheel 24 is mounted on a shaft 25 and positioned at a higher level over the right passageway 13. The wire 26 enters the preheater from the left, passes over the wheel 24, down through the right passageway 13, around the bottom wheel 15, up through the left passageway 13, over the wheel 22, back over the wheel 24, then out to the right. Viewing FIG. 1, heat is generated in the wire 26 between the wheels 24 and 15 through both strands of the wire. However, as shown in FIGS. 1 and 2, as the wire 26 leaves the wheel 22 towards the wheel 24, it is no longer vertical but at a flat angle so that its area of contact with the wheel 24 is less than ⅛ of a circumference. This reduces the heat loss by contact with the wheel to a minimum. Current is induced in the wire 13 to the left beyond the wheel 22 and up to the point of contact with the wheel 24. Because of the angle between the wire and the wheel 24 the current is induced almost to the point where the wire leaves the wheel. This reduces the point of contact to a minimum and the resultant heat loss is also at a minimum.

The above construction therefore results in an adapter which can easily be mounted to replace the upper wheel when small diameter wire is being run, and which can be quickly removed and replaced by the standard wheel. The device is simple and easy to manufacture and assemble. Other advantages of the present invention will be readily apparent to a person skilled in the art.

I claim:

1. In a wire preheater having an inductor and upper and lower shafts provided with rotatable grooved wheels, an adapter for replacing the upper wheel comprising a triangular plate, a collar adjacent one corner of said plate for mounting said plate on the upper shaft, a short shaft extending from said plate at each of the other two corners, an idler pulley wheel rotatably mounted on the shaft at one corner, and a double-grooved wheel rotatably mounted on the shaft in the other corner of said plate, said plate having one obtuse angle, said collar being located adjacent the obtuse angle, said plate having two short sides and a longer side, one of said short sides extending horizontally from said collar.

2. In a wire preheater having an inductor and upper and lower shafts provided with rotatable grooved wheels, an adapter for replacing the upper wheel comprising a triangular plate, a collar adjacent one corner of said plate for mounting said plate on the upper shaft, a short shaft extending from said plate at each of the other two corners, an idler pulley wheel rotatably mounted on the shaft at one corner, and a double-grooved wheel rotatably mounted on the shaft in the other corner of said plate, said plate having two short sides and a longer side, one of said short sides extending horizontally from said collar, said pulley wheel being at the end of said horizontal side.

3. In a wire preheater having an inductor and upper and lower shafts provided with rotatable grooved wheels, an adapter for replacing the upper wheel comprising a triangular plate, a collar adjacent one corner of said plate for mounting said plate on the upper shaft, a short shaft extending from said plate at each of the other two corners, an idler pulley wheel rotatably mounted on the shaft at one corner, and a double-grooved wheel rotatably mounted on the shaft in the other corner of said plate, said plate having one obtuse angle, said collar being located adjacent the obtuse angle, said plate having two short sides and a longer side, one of said short sides extending horizontally from said collar, said pulley wheel being at the end of said horizontal side.

4. In a wire preheater having an inductor and upper and lower shafts provided with rotatable grooved wheels, an adapter for replacing the upper wheel comprising a triangular plate, a collar adjacent one corner of said plate for mounting said plate on the upper shaft, a short shaft extending from said plate at each of the other two corners, an idler pulley wheel rotatably mounted on the shaft at one corner, and a double-grooved wheel rotatably mounted on the shaft in the other corner of said plate, said plate having two short sides and a longer side, one of said short sides extending horizontally from said collar, the wire being heated entering said preheater from one side, running over the upper plate wheel, down through the inductor, around the lower wheel, up through the inductor, over the pulley wheel, then over the upper wheel again and out through the opposite side.

5. In a wire preheater having an inductor and upper and lower shafts provided with rotatable grooved wheels, an adapter for replacing the upper wheel comprising a triangular plate, a collar adjacent one corner of said plate for mounting said plate on the upper shaft, a short shaft extending from said plate at each of the other two corners, an idler pulley wheel rotatably mounted on the shaft at one corner, and a double-grooved wheel rotatably mounted on the shaft in the other corner of said plate, said plate having one obtuse angle, said collar being located adjacent the obtuse angle, said plate having two short sides and a longer side, one of said short sides extending horizontally from said collar, the wire being heated entering said preheater from one side, running over the upper plate wheel, down through the inductor, around the lower wheel, up through the inductor, over the pulley wheel, then over the upper wheel again and out through the opposite side.

6. In a wire preheater having an inductor and upper and lower shafts provided with rotatable grooved wheels, an adapter for replacing the upper wheel comprising a triangular plate, a collar adjacent one corner of said plate for mounting said plate on the upper shaft, a short shaft extending from said plate at each of the other two corners, an idler pulley wheel rotatably mounted on the shaft at one corner, and a double-grooved wheel rotatably mounted on the shaft in the other corner of said plate, said plate having two short sides and a longer side, one of said short sides extending horizontally from said collar, said pulley wheel being at the end of said horizontal side, the wire being heated entering said preheater from one side, running over the upper plate wheel, down through the inductor, around the lower wheel, up through the inductor, over the pulley wheel, then over the upper wheel again and out through the opposite side.

7. In a wire preheater having an inductor and upper and lower shafts provided with rotatable grooved wheels, an adapter for replacing the upper wheel comprising a triangular plate, a collar adjacent one corner of said plate for mounting said plate on the upper shaft, a short shaft extending from said plate at each of the other two corners, an idler pulley wheel rotatably mounted on the shaft at one corner, and a double-grooved wheel rotatably mounted on the shaft in the other corner of said plate, said plate having one obtuse angle, said collar being located adjacent the obtuse angle, said plate having two short sides and a longer side, one of said short sides extending horizontally from said collar, said pulley wheel being at the end of said horizontal side, the wire being heated entering said preheater from one side, running over the upper plate wheel, down through the inductor, around the lower wheel, up through the inductor, over the pulley wheel, then over the upper wheel again and out through the opposite side.

References Cited by the Examiner
UNITED STATES PATENTS

| | | | |
|---|---|---|---|
| 2,797,468 | 7/57 | Brown | 242—151 |
| 3,045,094 | 7/62 | Coscia et al. | 219—10.61 |
| 3,106,354 | 10/63 | Kitselman | 242—47 |
| 3,117,209 | 1/64 | Peltier | 219—10.61 |

RICHARD M. WOOD, *Primary Examiner.*